United States Patent
Matsushita

(12) 
(10) Patent No.: US 10,139,218 B2
(45) Date of Patent: Nov. 27, 2018

(54) IMAGE PROCESSING APPARATUS AND IMAGE PROCESSING METHOD

(71) Applicant: CANON KABUSHIKI KAISHA, Tokyo (JP)

(72) Inventor: Takahiro Matsushita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 15/006,839

(22) Filed: Jan. 26, 2016

(65) Prior Publication Data

US 2016/0227121 A1 Aug. 4, 2016

(30) Foreign Application Priority Data

Jan. 29, 2015 (JP) ................................. 2015-016084

(51) Int. Cl.
| | |
|---|---|
| *G06K 9/00* | (2006.01) |
| *G01B 11/22* | (2006.01) |
| *H04N 5/262* | (2006.01) |
| *H04N 5/222* | (2006.01) |
| *G01B 11/02* | (2006.01) |

(52) U.S. Cl.
CPC ............ *G01B 11/22* (2013.01); *G01B 11/026* (2013.01); *G06K 9/00201* (2013.01); *G06K 9/00362* (2013.01); *H04N 5/2226* (2013.01); *H04N 5/2621* (2013.01)

(58) Field of Classification Search
None
See application file for complete search history.

(56) References Cited

U.S. PATENT DOCUMENTS

| | | | | |
|---|---|---|---|---|
| 9,077,893 | B2* | 7/2015 | Venkataraman | ............................ H01L 27/14618 |
| 9,207,759 | B1* | 12/2015 | El Dokor | .............. G06T 3/4015 |
| 9,485,518 | B2* | 11/2016 | Sugio | ..................... H04N 19/56 |
| 9,760,976 | B2* | 9/2017 | Kameyama | .............. G06K 9/52 |
| 2008/0089557 | A1* | 4/2008 | Iwaki | ....................... G01C 3/06 382/106 |
| 2008/0131019 | A1* | 6/2008 | Ng | ............................ G06T 5/50 382/255 |
| 2010/0103311 | A1* | 4/2010 | Makii | ................ H04N 5/23293 348/369 |
| 2012/0194385 | A1* | 8/2012 | Schmidt | ................. H01Q 1/246 342/368 |

(Continued)

FOREIGN PATENT DOCUMENTS

JP 2010-177741 A 8/2010

OTHER PUBLICATIONS

Suwajankakom et al ( depth from focus with your mobile phone) university of washington pp. 3497-3506,2015.*

*Primary Examiner* — Nancy Bitar
(74) *Attorney, Agent, or Firm* — Cowan, Liebowitz & Latman, P.C.

(57) ABSTRACT

An image processing apparatus and an image processing method that allow a user to easily use distance information of a subject of a captured image for image processing are disclosed. The disclosed image processing apparatus generates, from the captured image, a plurality of images, which respectively corresponds to ranges of individual subject distances, based on the distance information of the subject. Furthermore, the image processing apparatus selectably displays the generated plurality of images, and applies image processing to the selected image.

15 Claims, 10 Drawing Sheets

(56) References Cited

U.S. PATENT DOCUMENTS

2014/0232636 A1\* 8/2014 Hara ................ G06F 3/017
    345/156
2015/0117777 A1\* 4/2015 Hsun ................ G06T 11/60
    382/173

\* cited by examiner

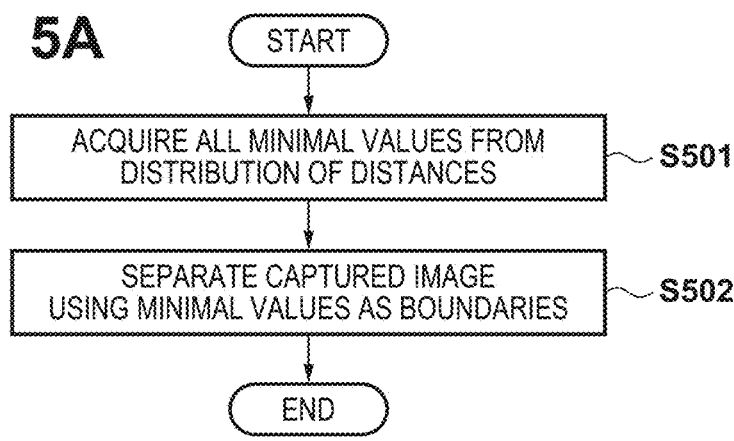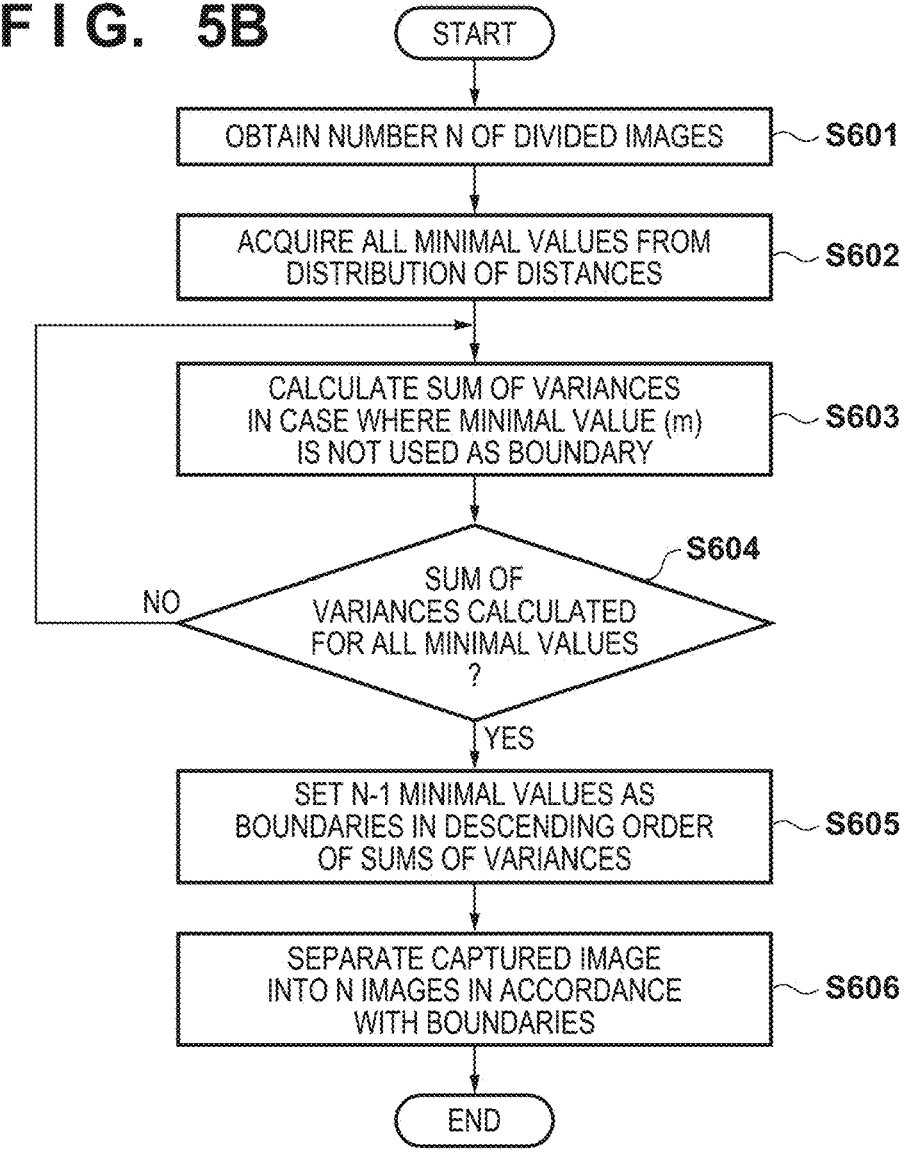

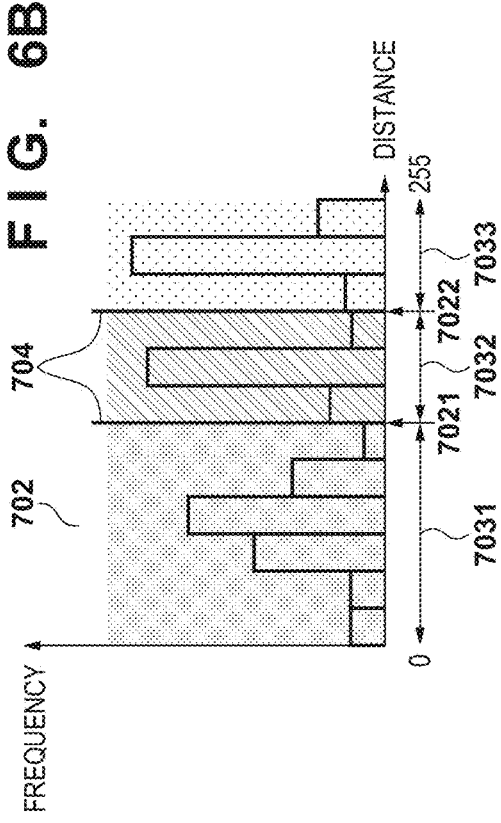
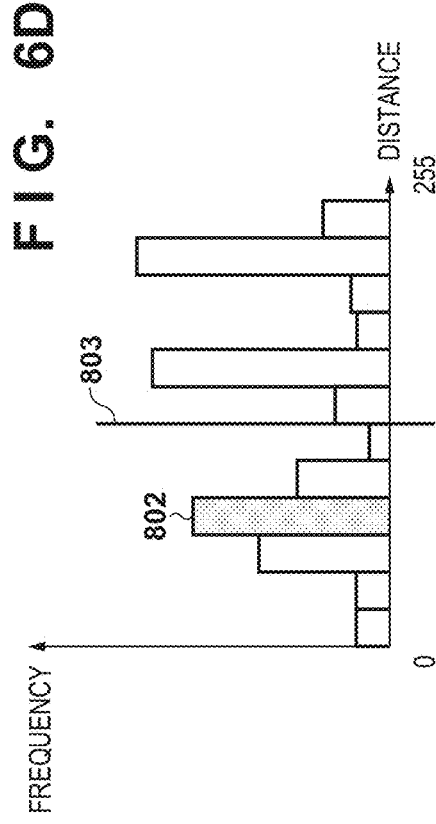
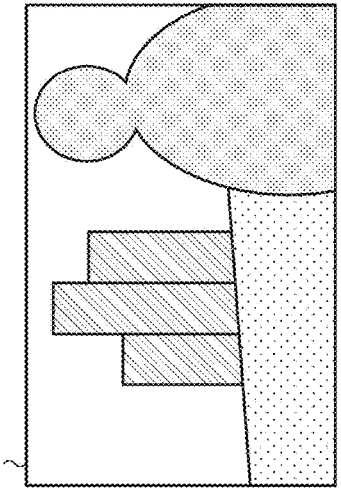
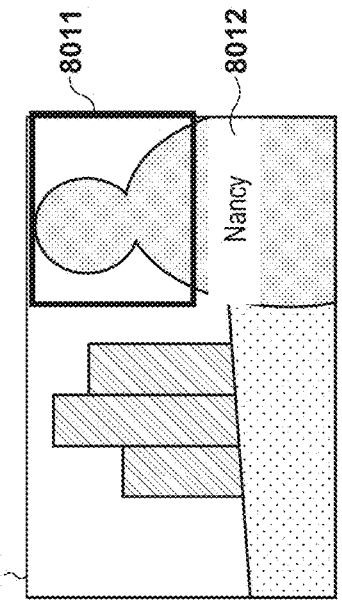

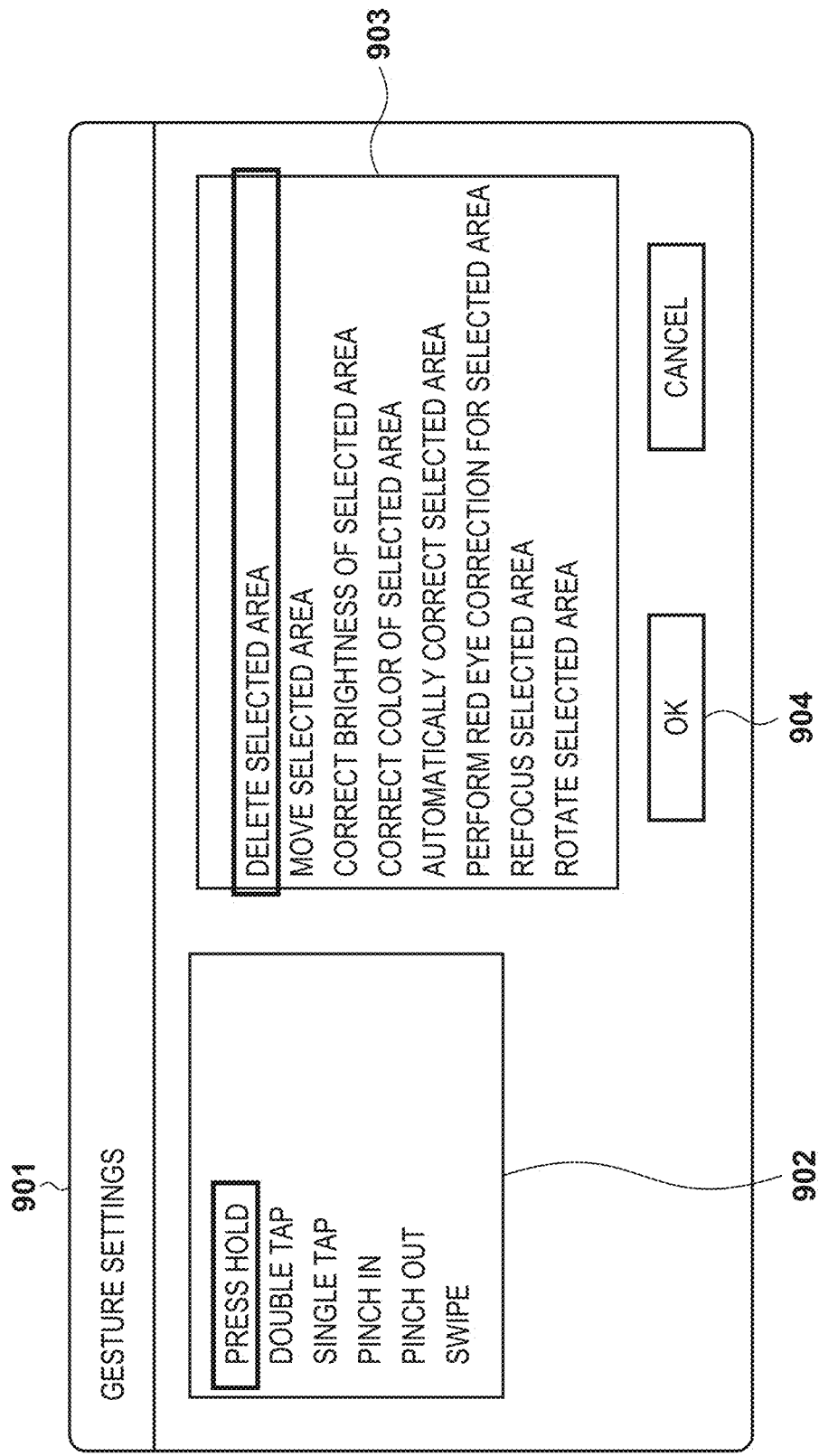

IMAGE PROCESSING APPARATUS AND IMAGE PROCESSING METHOD

BACKGROUND OF THE INVENTION

Field of the Invention

The present invention relates to an image processing apparatus and an image processing method, and in particular relates to an image processing technique using distance information of a subject.

Description of the Related Art

In recent years, image capture apparatuses that can obtain distance information (also referred to as depth information) of individual subjects that exist in a captured scene are known (Japanese Patent Laid-Open No. 2010-177741). In Japanese Patent Laid-Open No. 2010-177741, by using distance information of individual subjects to present a bird's-eye map that indicates the positional relation, in the depth direction, of the subjects in a scene as well as a current focus distance, a photographer can easily understand which subject is currently in focus.

However, conventionally, distance information of a subject is exclusively used for image processing that is performed by an apparatus during shooting, and use by a user was not envisioned. For example, a method for allowing the user to easily perform image processing using distance information of a subject in an image processing application for captured images has not been suggested.

SUMMARY OF THE INVENTION

The present invention has been made in light of the aforementioned issues with conventional technology. The present invention provides an image processing apparatus and an image processing method that allow a user to easily use distance information of a subject in a captured image for image processing.

According to one aspect of the present invention, there is provided an image processing apparatus comprising: an obtaining unit configured to obtain a captured image and distance information of a subject; a generation unit configured to generate, from the captured image, a plurality of images that respectively correspond to ranges of individual subject distances, based on the distance information; a display control unit configured to selectably display the plurality of images; and an image processing unit configured to apply image processing to an image selected from among the plurality of images.

According to another aspect of the present invention, there is provided an image processing method to be executed by an image processing apparatus, comprising: obtaining a captured image and distance information of a subject; generating, from the captured image, a plurality of images that respectively correspond to ranges of individual subject distances, based on the distance information; selectably displaying the plurality of images; and applying image processing to an image selected from among the plurality of images.

According to still another aspect of the present invention, there is provided a non-transitory computer-readable recording medium that stores a computer-executable program, the program, when executed by the computer, causing the computer to function as an image processing apparatus comprising: an obtaining unit configured to obtain a captured image and distance information of a subject; a generation unit configured to generate, from the captured image, a plurality of images that respectively correspond to ranges of individual subject distances, based on the distance information; a display control unit configured to selectably display the plurality of images; and an image processing unit configured to apply image processing to an image selected from among the plurality of images.

Further features of the present invention will become apparent from the following description of exemplary embodiments with reference to the attached drawings.

BRIEF DESCRIPTION OF THE DRAWINGS

FIGS. 5A and 5B are flowcharts for describing an example of a generation processing method of depth-divided images according to the embodiment.

FIGS. 6A to 6D are diagrams for describing the generation processing method of a depth-divided image according to the embodiment.

FIG. 9 is a diagram showing an example of a GUI in the image processing application according to the embodiment.

DESCRIPTION OF THE EMBODIMENTS

Exemplary embodiments of the present invention will now be described in detail in accordance with the accompanying drawings.

Figure 1:
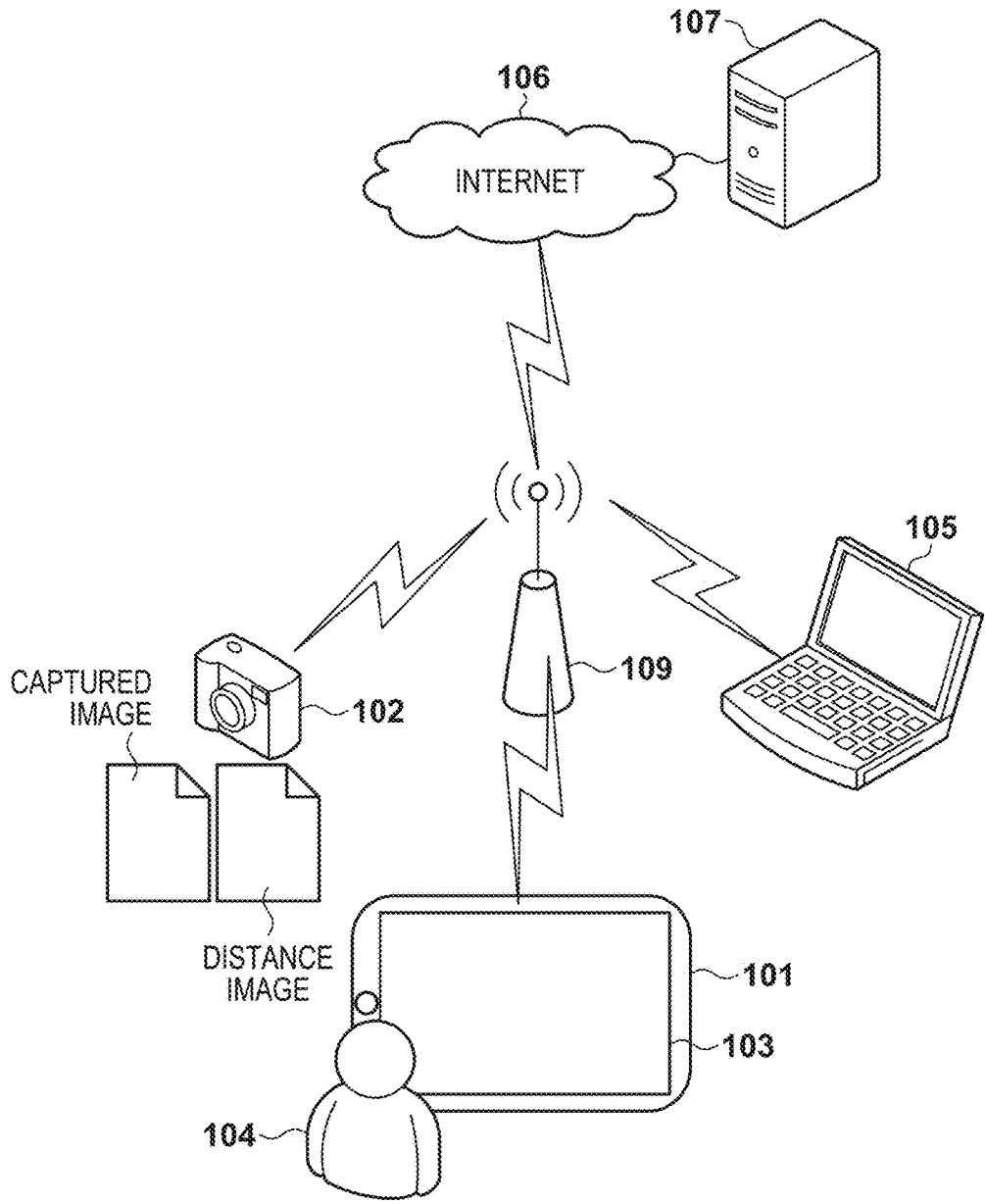
FIG. 1 is a diagram schematically showing usage forms of an image processing apparatus according to one embodiment of the present invention.

FIG. 1 schematically shows usage forms of an image processing apparatus according to one embodiment of the present invention. Here, a tablet computer 101, a digital camera 102, a personal computer (PC) 105 and a server 107 as specific examples of the image processing apparatus are shown. The tablet computer 101, the digital camera 102, and the PC 105 are connected to the same local network (LAN) through a router 109. The server 107 is communicably connected to the devices on the LAN through the Internet 106 as an example of a wide area network (WAN). Connection within the LAN may be wireless or wired, or a mixture of both.

FIG. 1 shows a mode in which a captured image that is to be image-processed and distance information of a shot scene in the captured image exist in the digital camera 102, and the tablet computer 101 or the PC 105 obtains the captured image and the distance information from the digital camera 102 and performs image processing. However, any of the tablet computer 101, the digital camera 102, the personal computer (PC) 105, and the server 107 can function as the image processing apparatus according to the present invention. More generally, the present invention can be realized in any suitable device that can obtain a captured image that is to be image-processed and distance information of a shot scene in the captured image, and can execute an image processing application that allows a user to perform image processing on the captured image using the distance information. Note that the image processing apparatus can be realized by a plurality of devices, such as the case in which the image processing application has a mode like a web application, and the case in which a portion of the processing is executed by an external apparatus.

The case in which the tablet computer 101 stores and executes an image processing application for a captured image will be described below. However, if a touch operation is replaced with an operation of a pointing device such as a mouse, or combination of a cursor key of a keyboard and an execute key, the present invention can also be realized in the case in which the PC 105 or the server 107 executes the image processing application. Also in the digital camera 102, if the operation thereof is replaced with a touch operation similar to that of the tablet computer 101, an operation on a direction key or the like, a similar image processing application can be implemented.

The tablet computer 101 obtains a captured image and distance information corresponding to the captured image from the digital camera 102 through the LAN. The obtaining method is not limited, and the captured image and the distance information may be directly transferred from the digital camera 102 to the tablet computer 101, or may be obtained by being attached to an e-mail and transmitted from the digital camera 102 to a server, and the tablet computer 101 receiving the e-mail from the server. In addition, the digital camera 102 and the tablet computer 101 may be directly connected with a cable so as to transfer the captured image and the distance information, or the captured image and the distance information may be read by the tablet computer 101 from a memory card.

Figure 2:
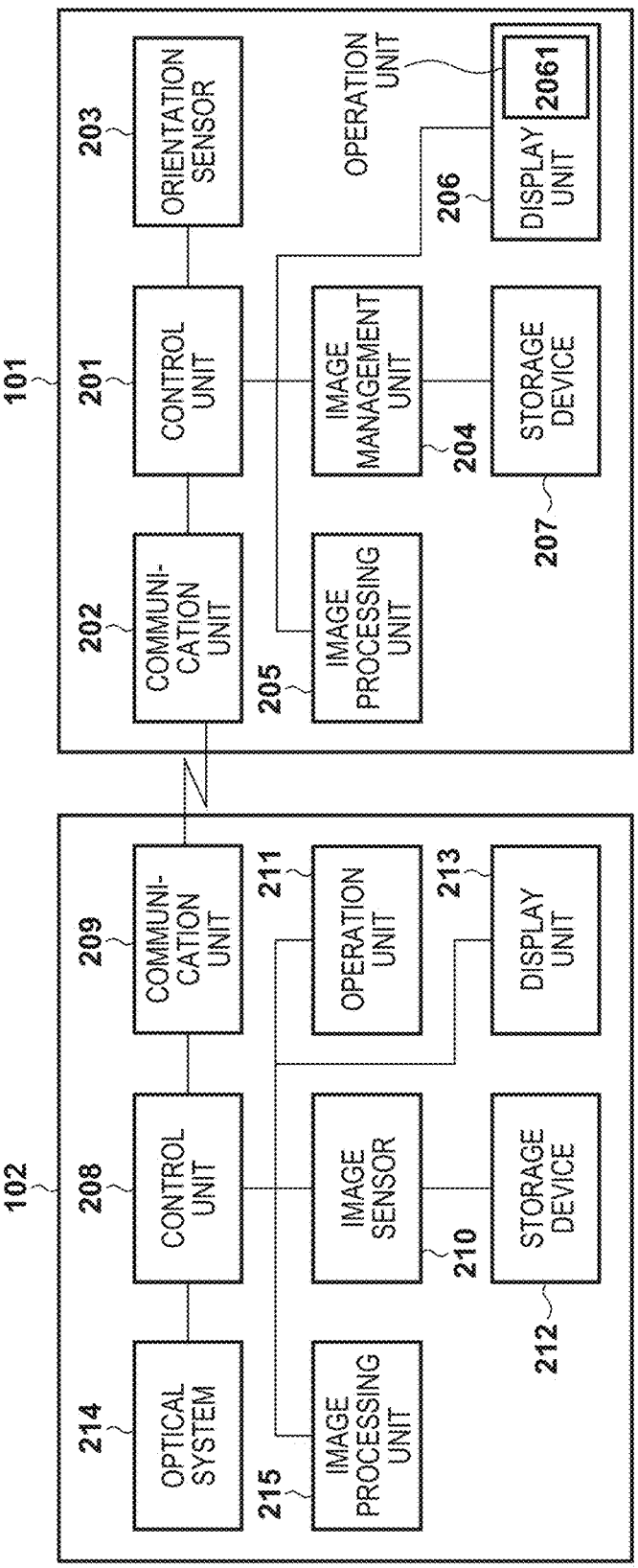
FIG. 2 is a block diagram showing a functional configuration example of a tablet computer 101 and a digital camera 102 in FIG. 1.

FIG. 2 is a block diagram showing a functional configuration example of the tablet computer 101 and the digital camera 102 in FIG. 1. The digital camera 102 is provided with an optical system 214, an image sensor 210, a control unit 208, a storage device 212, an image processing unit 215, a display unit 213, an operation unit 211, and a communication unit 209. Note that functional blocks other than those shown in FIG. 1 may be added. For example, a sensor that detects movement of the digital camera 102 for image stabilization may be added.

The optical system 214 has a lens, a shutter, and a diaphragm, and the control unit 208 can control a focus distance, an opening amount of the diaphragm, and opening and closing of the shutter. The image sensor 210 converts an optical image formed on an image capturing plane by the optical system 214 into an electrical signal for each pixel and outputs the electrical signal.

For example, the control unit 208 has a programmable processor (hereinafter, a CPU), a nonvolatile memory such as a ROM, and a volatile memory such as a RAM, and causes the CPU to execute a program stored in the ROM and controls the units so as to realize the functions of the digital camera 102. The control unit 208 realizes automatic exposure control (AE) and automatic focus detection (AF) based on luminance information, contrast information or the like of a captured image in the image sensor 210.

The storage device 212 stores captured images, distance images and the like. The storage device 212 may be configured with at least one of a detachable storage medium such as a memory card and a fixed storage medium.

The image processing unit 215 performs A/D conversion, noise reduction processing, edge enhancement processing, gamma correction processing and the like on an image signal output from the image sensor 210, and generates RAW image data. The image processing unit 215 also performs white balance adjustment processing, developing processing such as demosaic processing, encoding processing and the like on RAW image data, as necessary. Some of or all the functions of the image processing unit 215 may be realized by the control unit 208 in a software-like manner.

The display unit 213 displays a live view image at the time of shooting stand-by or moving image shooting, captured images, various types of information such as the status of the digital camera 102 and various setting values, a user interface such as a menu screen and the like. The display unit 213 is typically a flat panel display, and may be provided with a touch panel.

The operation unit 211 is a group of input devices for sending various instructions to the digital camera 102 from a user, and is constituted by a button, a key, a lever, a switch, and a touch panel, for example. A release button for sending a shooting preparation instruction and a shooting instruction, a power supply switch, a direction key, a determination button, a menu button and the like are included.

The communication unit 209 is a communication interface for performing transmission/reception of control commands and data with an external apparatus. For example, communication protocols typically used in a digital camera when communicating with an external apparatus include the following: PTP (Picture Transfer Protocol) and MTP (Media Transfer Protocol), or protocols in relation to NFC (Near Field Communication) such as ISO/IEC 14443 A/B and JIS X6319-4. Note that the communication unit 209 may communicate with an external apparatus using wired connection based on a standard such as USB (Universal Serial Bus) or HDMI (registered trademark) (High-Definition Multimedia Interface). Communication with an external apparatus may also be performed using a wireless LAN or wireless connection based on a standard such as Bluetooth (registered trademark). In addition, direct connection to an external apparatus may be adopted, or connection via a server or a network such as the Internet may be adopted.

Note that a captured image and distance information are usually transferred from the storage device 212 to an external apparatus via the communication unit 209, but may be transferred to the external apparatus without the communication unit 209, in the case where the storage medium has a wireless communication function.

The digital camera 102 has shooting mode for generating distance information of a captured scene, and executes an operation of generating distance information in addition to usual shooting operations in the case where this shooting mode is set. In this embodiment, distance information of a captured image has the same number of pixels as the captured image, and has a format of a distance image in which the value of each pixel indicates a distance, although the format is not limited thereto. The number of pixels in the captured image and the number of pixels in the distance image may be different, such as, for example, the distance image being constituted vertically and horizontally by half the number of pixels of the captured image as having half the resolution of the captured image. Information indicating the position and distance of the area of a specific subject (e.g., a person) that exists in the captured image may be used. In addition, data of the captured image and data of the distance image may be in a format in which the data exist individually, or in a format in which the data is gathered as one piece of data. Note that the method for generating such distance information using a digital camera is not particularly limited, and any suitable methods including various methods described in Japanese Patent Laid-Open No. 2010-177741 can be used, for example. The control unit 208 stores generated captured images and distance images in the storage device 212.

The tablet computer 101 is typically a slate-shaped mobile information terminal that has a touch panel display and does not have a hardware keyboard, and the functional configuration thereof is the same as that of a general information processing apparatus (PC). In other words, the tablet computer 101 is provided with a control unit 201, a communication unit 202, an orientation sensor 203, an image management unit 204, an image processing unit 205, a display unit 206, and a storage device 207.

The communication unit 202 is a communication interface for performing transmission/reception of control commands and data with an external apparatus. For example, the communication unit 202 receives a captured image and distance information from the digital camera 102 or the PC 105 connected to the same network, the server 107 on the Internet or the like. The communication unit 202 can have various modes, similarly to the communication unit 209 of the digital camera 102.

For example, the control unit 201 has a programmable processor (hereinafter, a CPU), a nonvolatile memory such as a ROM, and a volatile memory such as a RAM, causes the CPU to execute a program stored in the ROM, and controls the units to realize the functions of the tablet computer 101.

The orientation sensor 203 is a sensor that detects the orientation of the tablet computer 101, and may be a triaxial gyro sensor, for example.

The image processing unit 205, based on a captured image and distance information that have been obtained, separates the captured image into a plurality of images such that each of the plurality of images includes only a subject in a specific distance range. The image processing unit 205 also applies decoding processing if the obtained captured image is encoded, and developing processing if the obtained captured image is a RAW image. Furthermore, the image processing unit 205 executes recognition of a facial area as an example of a specific subject area, and individual recognition processing based on a feature amount of registered faces. The image processing unit 205 also provides an image processing function that is typically provided by an image processing application. Note that some of or all the functions of the image processing unit 215 may be realized by the control unit 201 in a software-like manner, or may be realized by dedicated hardware such as FPGA, ASIC or the like.

The storage device 207 is a nonvolatile storage device as typified by SSD and HDD, on which an OS, applications, image data and the like are stored. The image management unit 204 manages data obtained via the communication unit 202 including captured images and distance information, image data processed by the image processing unit 205, and the like. For example, information for realizing undo processing in the image processing application, association of an image that is to be processed with corresponding distance information, and the like are also managed by the image management unit 204. The display unit 206 is a flat panel display such as an LCD, an organic EL display or the like, and is provided with an operation unit 2061 that is a touch panel. The display unit 206 displays a graphical user interface (GUI) of an OS or an application in accordance with control from the control unit 201.

Figure 3:
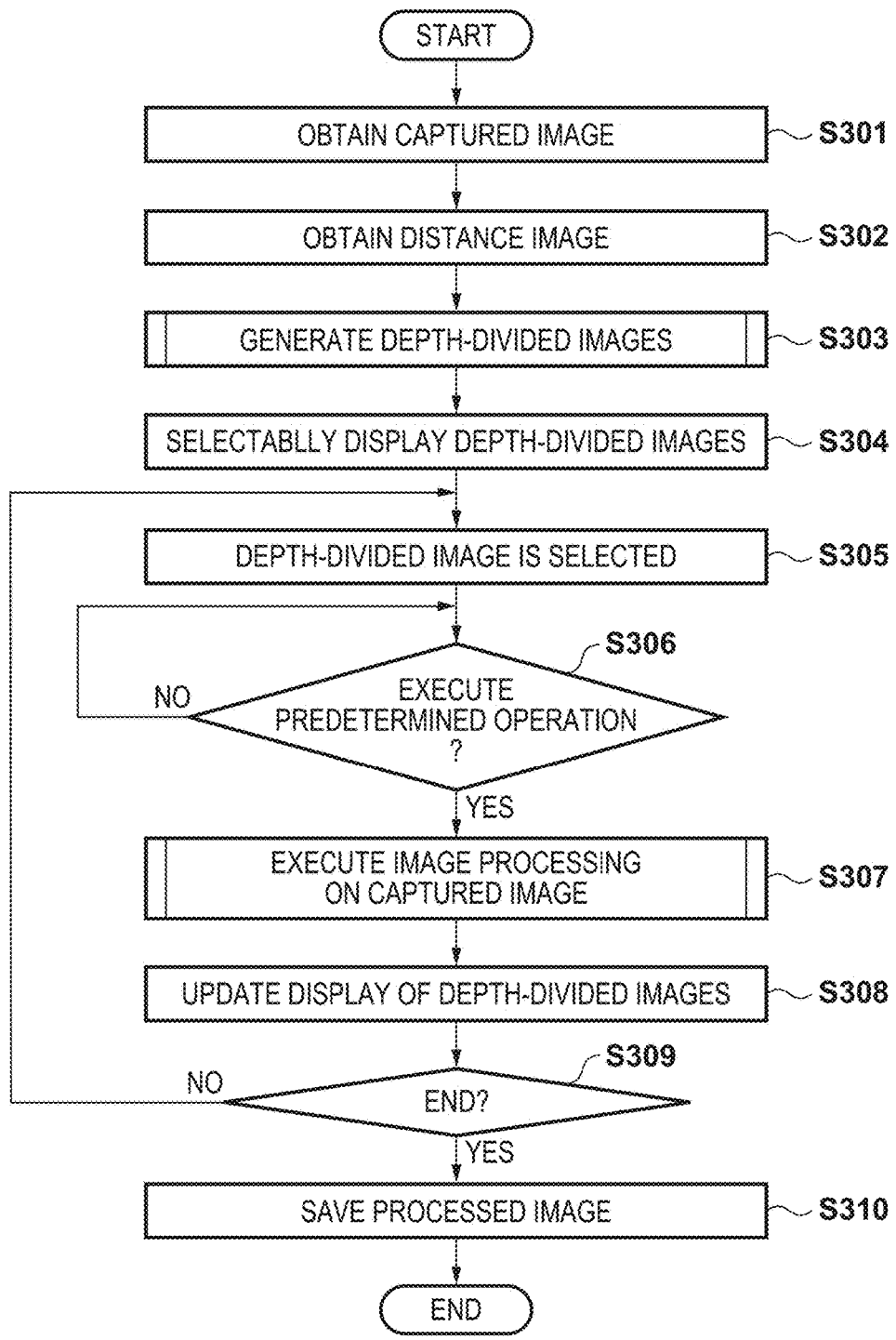
FIG. 3 is a flowchart for describing an overall processing flow of an image processing application according to the embodiment.

Next, a flow of overall processing of an image processing application according to this embodiment will be described with reference to a flowchart in FIG. 3.

When a starting operation is performed, for example, a tapping operation on an icon of the image processing application displayed on the display unit 206 is performed through the operation unit (touch panel) 2061, the control unit 201 reads out the image processing application from the storage device 207 and executes the image processing application. The control unit 201 then displays a GUI for selecting an image to be processed, for example, a file browsing GUI provided by the OS, and waits for a user instruction.

When a user specifies a captured image file to be processed, the control unit 201 obtains the specified captured image and distance information (distance image) corresponding thereto from the storage device 207 (S301 and S302).

In S303, the control unit 201 generates a plurality of images from the captured image using the image processing unit 205. Specifically, the image processing unit 205 acquires, from the distance image, the distribution of distances at which a subject exists, and divides a distance range of the subject into a plurality of distance ranges. The image processing unit 205 then extracts, for each of the divided distance ranges, a corresponding image area of the subject from the captured image, and generates a plurality of images from the captured image. Hereinafter, the generated images are referred to as depth-divided images. The image processing unit 205 stores the generated depth-divided images in the storage device 207 in association with the captured image and the distance image, for example.

Figure 4:
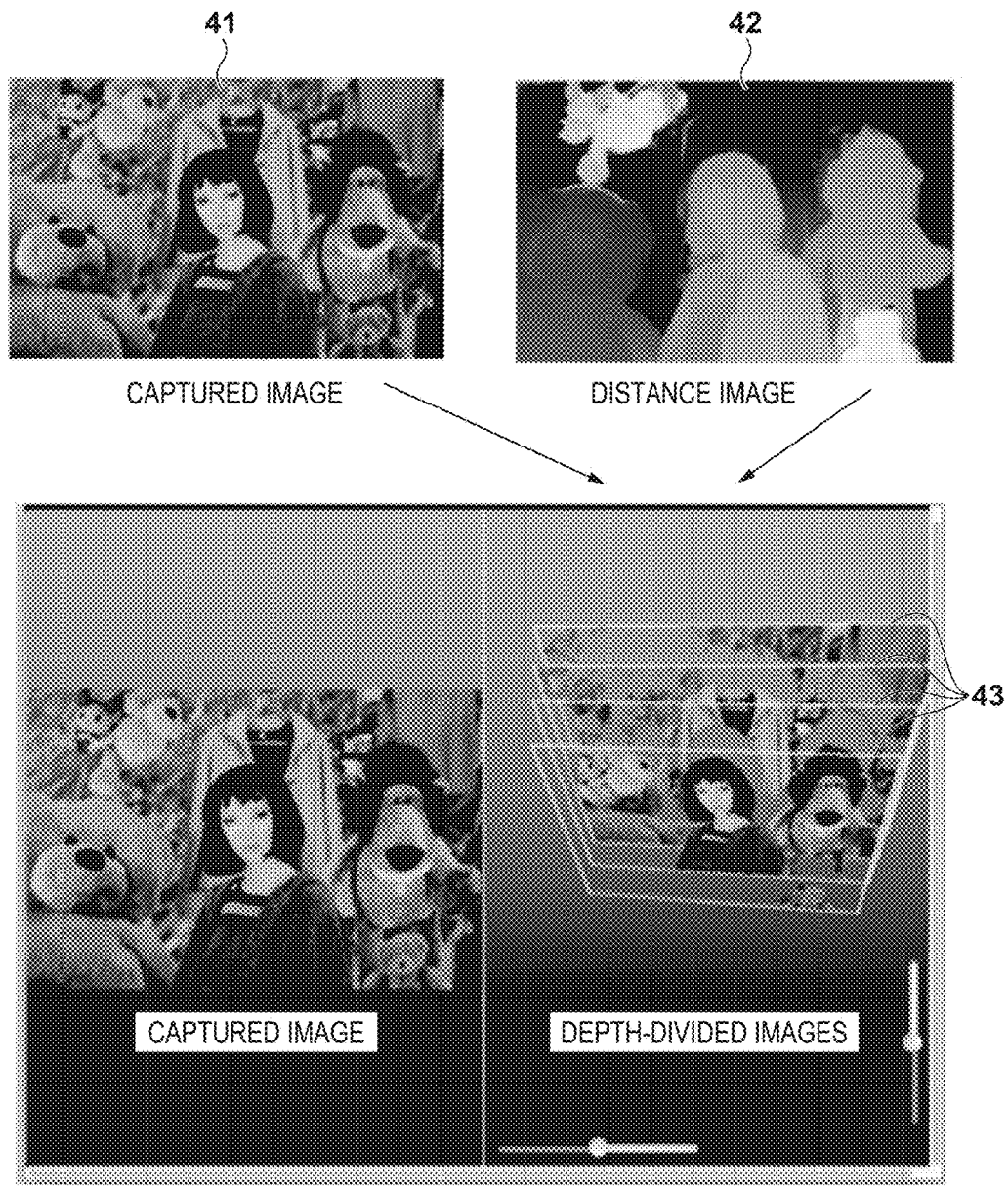
FIG. 4 is a diagram showing examples of a captured image, a distance image, and depth-divided images.

FIG. 4 shows examples of a captured image, a distance image, and depth-divided images. A distance image 42 is a monochromatic image that has the same number of pixels as the captured image 41, and in which each of the pixel values (luminance values) indicates a subject distance of the corresponding pixel. The image processing unit 205 divides the range of the subject distances based on the distribution of the pixel values of the distance image 42 (i.e., distribution of the subject distances), extracts a corresponding area of the captured image for each of the ranges of the subject distances, and generates depth-divided images 43. In the examples of FIG. 4, the range of the subject distances is divided into four, and the depth-divided image 43 is generated for each of the ranges. As shown in FIG. 4, the depth-divided images 43 have a subject area that exists in the corresponding distance range, and in areas of the subject that exist in other distance ranges, either pixels are not included or transparent pixels are arranged. In addition, depth-divided images that are displayed may be reduced-size images. A specific example of a generation method of the depth-divided images will be described later.

In S304, the control unit 201 displays the generated depth-divided images in an area in the GUI of the image processing application, in a form that allows the scale of corresponding distances to be understood, and that allows the depth-divided images to be individually selected, and waits for a selecting operation by the user. For example, as shown in FIG. 4, display is possible such that a depth-divided image corresponding to a short distance is arranged at the front, a depth-divided image corresponding to a long distance is arranged at the back, and at least some of all of the depth-divided images are visible.

Note that in the examples of FIG. 4, display is performed with a three-dimensional visual effect such that it appears like a plurality of depth-divided images are superimposed one on the other, but such a visual effect is not necessary. In addition, the depth-divided images do not have to be arranged from the front to the back, and any display format may be adopted as long as the depth-divided images are arranged in a direction in which the corresponding subject distances increase or decrease, for example, the depth-divided images are arranged such that the distances increase from the right to the left.

When one of the depth-divided images is selected by the user in S305, the control unit 201 designates the selected depth-divided image as an image that is to be image-processed, and displays it in an area for an image to be image-processed, in the GUI of the image processing application. In other words, the control unit 201 extracts the one depth-divided image that the user selected from among the plurality of depth-divided images, and displays it as an image to be image-processed. At this time, list display of the depth-divided images (display as shown on the right side of FIG. 4) may be hidden or display may be continued.

The control unit 201 then applies predetermined image processing to the image to be processed, using the image processing unit 205, in accordance with a touch operation that is given by the user to the GUI of the image processing application or to the image (S306 and S307). A result of applying the image processing is then reflected on the list display of the depth-divided images (S308). Thereby, the user can understand the influence that the image processing of the depth-divided image exerts on the captured image.

The user can repeat selection of a desired depth-divided image, and application of image processing as necessary. In the case where an instruction to end the image processing application or an instruction to change the captured image to a new captured image is given in S309, the control unit 201 causes an image processing result of the current captured image to be stored in the storage device 207 in S310, for example. The control unit 201 then ends the image processing application, or returns the procedure to S301.

Next, two examples of generation processing of depth-divided images in S303 in FIG. 3 will be described with reference to the flowcharts of FIGS. 5A and 5B.

First, a first example will be described with reference to the flowchart in FIG. 5A. First, in S501, the image processing unit 205 generates a histogram of a distance image corresponding to a captured image. As described above, a distance image is distance information in which pixel values indicate subject distances, and thus a histogram of the pixel values indicates a distribution frequency of the subject distances. Here, assume that the pixel value is an 8 bit (0 to 255) value. Note that the width of the classes of the histogram can be determined in advance.

The image processing unit 205 then detects minimal values of the distribution frequency of the subject distances. FIGS. 6A and 6B show an example of a histogram corresponding to a distance image. In the case where the histogram as in FIG. 6B is obtained, the image processing unit 205 detects, as the minimal values, maximum subject distances (in FIG. 6B, 7021 and 7022) that are classified into a class in which the distribution frequency is a minimal value.

Next, in S502, the image processing unit 205 divides a range of the subject distances using the detected minimal values as boundaries. In the example of FIG. 6B, two minimal values were detected, and thus a subject distance of 0 to 255 is divided into three ranges 7031, 7032, and 7033. Typical subjects exist at relatively close distances, and thus a plurality of subjects at different distances that are included in a shot scene are easily separated into different depth-divided images, by dividing the range of subject distances using the minimal values of the distribution frequency of the subject distances.

The image processing unit 205 then generates, for each of the divided ranges, an image (depth-divided image) constituted by the pixels of the captured image that correspond to the pixels of the classified distance image. Therefore, in the example of FIG. 6B, a depth-divided image is generated for each of the ranges 7031 to 7033, and three depth-divided images in total are acquired.

In this method, the number of depth-divided images that are generated is the number of detected minimal values+1, and therefore, the number of depth-divided images is not fixed. It is therefore conceivable that the number of depth-divided images increases depending on a shot scene, and that operability of image processing for which divided images are specified is deteriorated. Accordingly, a configuration may be adopted in which the range of subject distances is divided more effectively so as to generate a specific number of depth-divided images. An example of a method for generating a specific number of depth-divided images will be described with reference to the flowchart in FIG. 5B.

In S601, the image processing unit 205 obtains a number N of depth-divided images that are to be generated. The number N may be a value that can be set by the user, or may be a fixed value. The image processing unit 205 can obtain the number N from the control unit 201, for example.

In S602, the image processing unit 205 detects all of the minimal values of the distribution frequency of subject distances, similarly to S501. Here, assume that the number of the detected minimal values is n (n is an integral greater than or equal to 1).

In S603, for the case where the range of subject distances is divided without using a minimal value (m) (m=1 to n) out of n minimal values as a boundary, the image processing unit 205 calculates the variance in each of the divided ranges, and obtains the sum of the variances.

If the processing of S603 has been performed on all the minimal values by the image processing unit 205 in S604, the procedure is shifted to S605, and if there is an unprocessed minimal value, the procedure is shifted to S603.

In S605, the image processing unit 205 selects N−1 minimal values in ascending order of the sums of variances, as boundaries for generating depth-divided images. A large sum of variances in the case where a certain minimal value is not used as a boundary means that the sum of variances would be smaller if the minimal value is used as the boundary, that is, that a group of distributions can be effectively divided.

In S606, the image processing unit 205 separates the captured image into N depth-divided images, in accordance with the boundaries selected in S605. Note that in the case of n N, there is no need to perform the processing of S603 onward, and thus depth-divided images may be generated by the same method as in FIG. 5A. In this case, it is sufficient that S602 is followed by processing similar to that of S502.

Note that here, a method for automatically determining generating conditions (the number and the boundary positions) of a depth-divided image was described. However, a configuration may be adopted in which automatically determined generating conditions can be changed by the user. In this case, for example, a configuration can be adopted in which the histogram as shown in FIG. 6B is displayed along with an indicator 704 that indicates the automatically determined boundaries, and the user can change the position of the indicator 704 on the histogram, and add or delete the indicator 704. In addition, in FIG. 5B, the minimal values that are to be the boundaries are determined based on the sum of variances, but other statistic values (a mean value, a standard deviation or the like) may be used to determine boundaries. Also, a configuration may be adopted in which a distance range is equally divided (divided into (N−1)).

For example, in cases such as wanting to generate a depth-divided image that includes only a specific subject, it is necessary to understand in which class in the histogram the subject is distributed. However, even if the contour of subjects can be determined from a distance image to some extent, it is difficult to understand, in the case where there are a plurality of subjects having similar contours, what these subjects are. For example, it is not easy to determine a specific person from a distance image of a captured image in which a plurality of persons are shown.

FIG. 6C shows an example of a configuration for alleviating such a problem by adding, to a distance image, additional information for identifying a subject, such as a recognition result of a person. Although a distance image 801 is the same as that in FIG. 6A, an indicator 8011 indicating a facial area of a person recognized in a captured image, and a name 8012 of the recognized person are superimposed and displayed. Also in a histogram 802, a class 8021 into which pixels corresponding to the facial area are classified is displayed in an identifiable manner. Even in the case where a plurality of subjects are recognized, the correspondence relation is clarified by displaying the indicator that indicates the recognized subjects and the corresponding classes in the same color, for example.

Therefore, a user sets an indicator 803 of a boundary in the histogram 802 to a minimal value that is close to the class 8021, thereby making it possible to separate the recognized person and another subject into different depth-divided images.

Note that, instead of a face-recognized subject, manual setting of divided positions (boundaries) may be assisted by another method such as by a distance image and a histogram indicating an area that is in focus in a captured image.

Figure 7A:
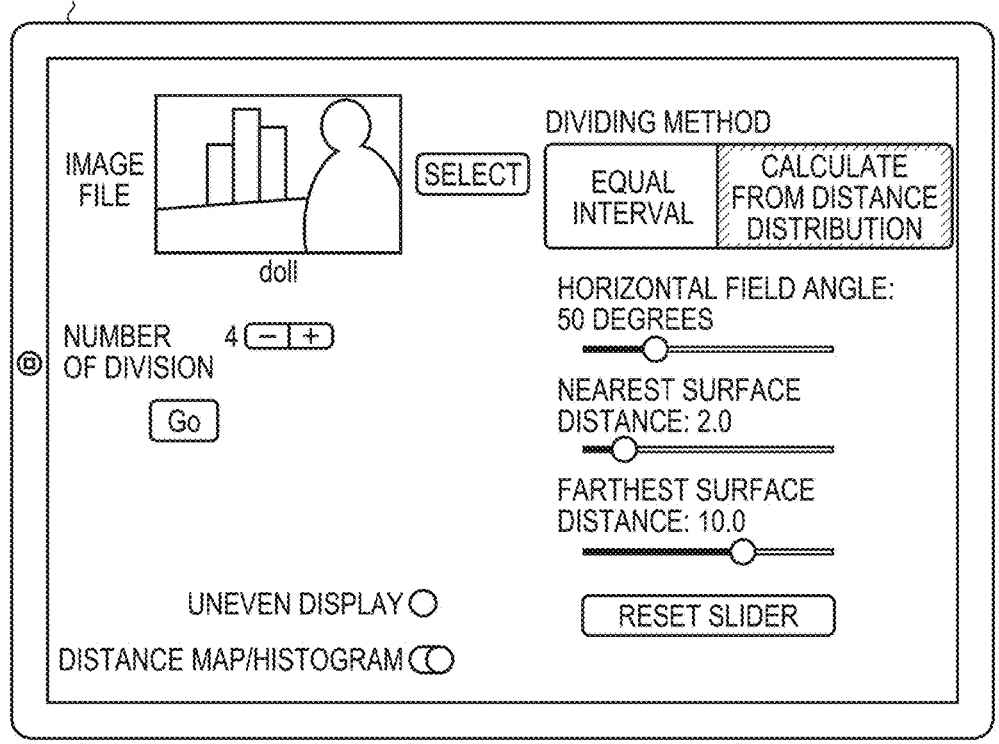
FIGS. 7A and 7B are diagrams showing examples of a GUI in the image processing application according to the embodiment.

FIG. 7A shows an example of a GUI (setting screen) for setting a generation condition of depth-divided images, in the image processing application according to this embodiment. In this example, on a setting screen 901, selection of a captured image that is to be processed, conditions such as the number of depth divisions, a dividing method, a horizontal field angle, a nearest surface distance, and a farthest surface distance can be specified. Note that as the dividing method, equal intervals and a determining method in accordance with distance distribution (FIG. 5A or 5B) can be selected. As described below, in this embodiment, the depth-divided images are displayed like a projection surface of a view volume in perspective projection, and therefore a configuration is adopted in which the horizontal field angle, the nearest surface distance and the farthest surface distance are specified as parameters that define the view volume.

In the example of FIG. 7A, a configuration is adopted in which setting as to whether or not to display a distance image and a histogram on an image editing screen can be configured from the setting screen 901. Note that the contents and number of items that can be set on the setting screen 901 is not limited to the example in FIG. 7A. Note that the setting screen 901 may be displayed when a captured image to be processed is selected after starting an image application, or may be displayed at any suitable timing in accordance with a user instruction.

Figure 7B:
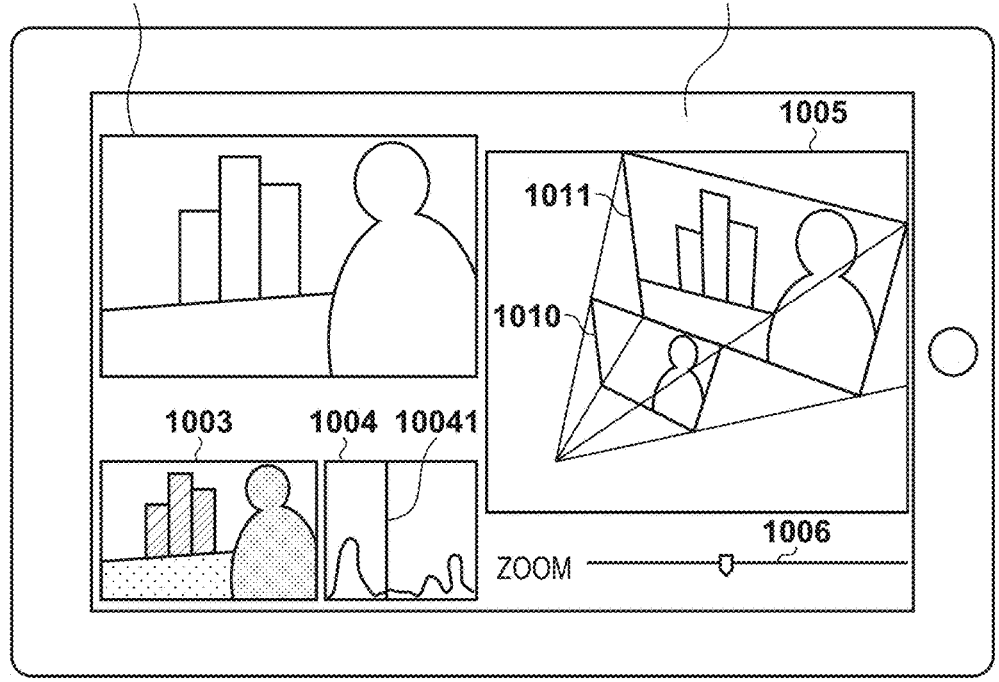

FIG. 7B shows an example of a GUI (editing screen) 1001 for performing image editing using a depth-divided image, in the image processing application according to this embodiment. On the left half of the editing screen, a captured image 1002 to be processed, a corresponding distance image 1003 and a histogram 1004 are individually displayed in separate areas. In addition, an indicator 10041 that indicates a boundary for generating divided images is superimposed and displayed in the histogram. On the other hand, on the right half of the editing screen, a display area 1005 for generated depth-divided images and a zoom slider 1006 are provided.

As described above, in this embodiment, generated depth-divided images 1010 and 1011 are displayed like a projection surface of a view volume used in perspective projection, such that the depth-divided image corresponding to a shorter distance is smaller, and the depth-divided image corresponding to a longer distance is larger. However, this is merely an example, and display may be performed by another method. In FIG. 7B, the depth-divided image 1010 corresponding to a subject on the short distance side and the depth-divided image 1011 corresponding to the subject on the long distance side, both having been generated based on one boundary shown in the histogram 1004, are displayed as the nearest surface and the farthest surface of the view volume. The zoom slider 1006 makes it possible to individually change the sizes of depth-divided images.

Figure 8A:
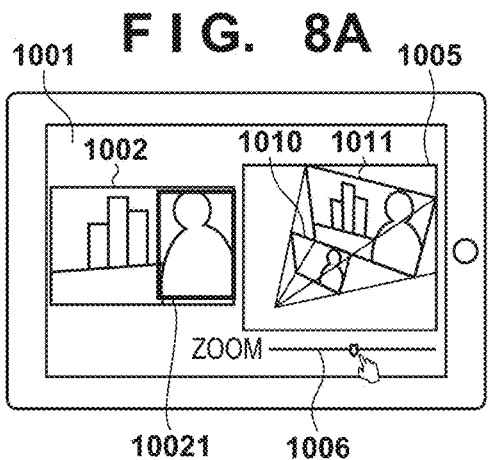
FIGS. 8A to 8F are diagrams for describing examples of image processing according to the embodiment.
Figure 8B:
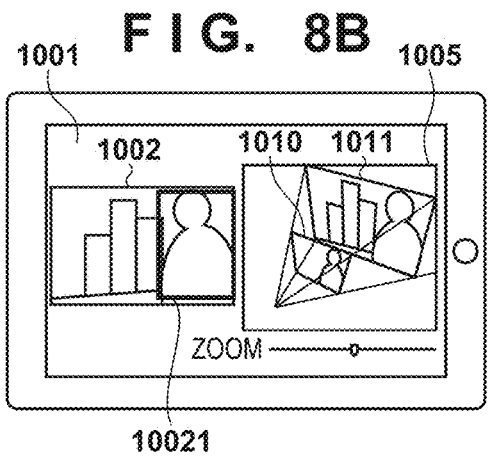

Next, examples of image processing will be described with reference to FIGS. 8A to 8F. FIGS. 8A and 8B are diagrams schematically showing examples of image processing using the zoom slider 1006. In FIGS. 8A to 8F, the same contents as in FIG. 7B are displayed except that a distance image and a histogram are not displayed. FIG. 8A shows a state in which the depth-divided image 1011 is selected by being tapped on the display area 1005 or by a corresponding subject in the captured image 1002 being tapped, for example. An indicator 10021 indicating a subject area in a selected state is shown in the captured image 1002. In the display area 1005, display is performed, for example, such that a color or a width of the frame of the selected depth-divided image 1011 is different from that of another depth-divided image, so as to allow those images to be visually distinguished from each other.

Here, a display example in the case where the zoom slider 1006 is moved to the left by a predetermined amount is shown in FIG. 8B. In this embodiment, the control unit 201 recognizes the movement of the zoom slider 1006 as an instruction of image processing for independently changing the size (field angle) of a depth-divided image that has not been selected, and causes the image processing unit 205 to apply image processing. FIG. 8B shows an example in which a depth-divided image that has not been selected on the long distance side is zoomed in. The control unit 201 also causes an application result of the image processing to be reflected on display of the captured image 1002. In this manner, an effect like a so-called dolly zoom (dolly in and dolly out) can be acquired by fixing the size (field angle) of the selected depth-divided image 1010, and changing the size of the other depth-divided image 1011.

Here, the example of a configuration in which the size of the selected depth-divided image is fixed, and the size of the depth-divided image that has not been selected is changed was described. However, a configuration in which conversely, the size of the selected depth-divided image is changed, and a configuration in which both the configurations can be switched maybe adopted. In addition, besides a method for directly selecting a depth-divided image as described above, a configuration may be adopted in which a depth-divided image corresponding to a subject area selected (tapped) on the captured image 1002 is selected.

Figure 8C:
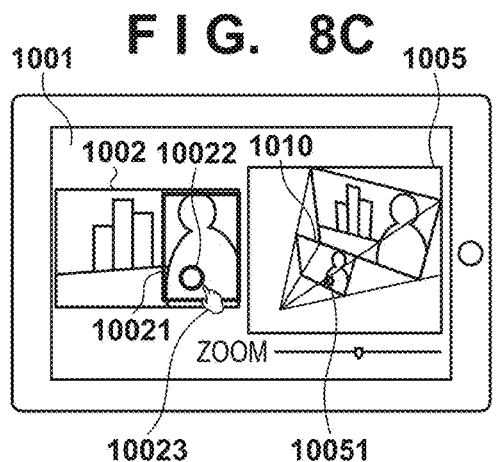
Figure 8D:
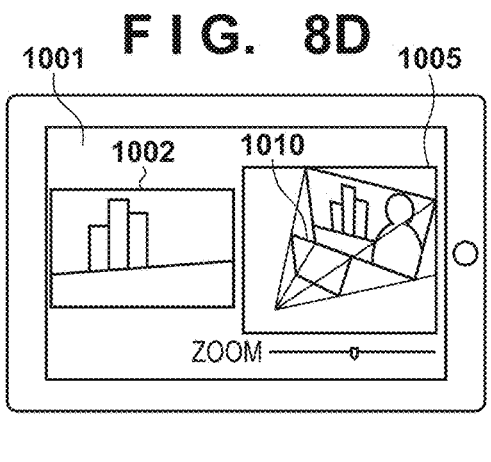

FIGS. 8C and 8D show examples of image processing for deleting a subject by manipulating the captured image 1002. FIG. 8C shows a state in which a position 10022 of the area of a person included in the captured image 1002 is being tapped, and the area of the person is selected. As described above, when a subject area is selected, an indicator (here, the indicator 10021 having a frame-like shape) that allows the selected subject area to be determined is displayed. Note that even if the depth-divided image 1011 is selected, the similar indicator 10021 is displayed on the captured image 1002. Note that as shown in FIG. 8C, a configuration may be adopted in which a position that is being tapped in one of the captured image 1002 and the depth-divided images 1010 and 1011 is displayed on the other. In FIG. 8C, in accordance with the position 10022 in the captured image 1002 being tapped by a user's finger 10023, a corresponding position 10051 in the depth-divided image 1011 is displayed.

A configuration is possible in which, when the tapping is continued for a certain amount of time (press-hold) in this state, predetermined image processing is executed on the selected subject area. FIG. 8D schematically shows the case in which processing for deleting a selected subject area has been performed. Note that the deleted subject area can be interpolated using peripheral pixels, or a portion of a copied background. Alternatively, a captured image of a similar scene may be used for the interpolation. Note that here, a configuration in which the selected subject area is designated as an image to be image-processed was described, but the entirety of the depth-divided image in which the selected subject area is included, or all the subject areas included in the same depth-divided image may be designated as the image to be image-processed. In addition, a configuration may be adopted in which similar image processing is also performed in the case where the operation described as an operation for a captured image is performed on a depth-divided image.

FIG. 9 shows an example of a setting screen for associating a touch operation on a captured image or a depth-divided image on the image editing screen with image processing to be executed. The setting screen 901 can be displayed by the control unit 201 in response to selection on a menu of the image processing application. The setting screen 901 has an operation list area 902 on which a list of touch operations is displayed, and a processing list area 903 on which a list of candidates of image processing to be associated therewith is displayed.

When one touch operation is selected in the operation list area 902, the list of image processing that can be associated therewith is displayed in the processing list area 903. Regarding the relation between a touch operation and image processing that can be associated therewith, a touch operation in the operation list area 902 that is in a selected state is associated with image processing in the processing list area 903 that is in a selected state. When an OK button 904 is tapped, the control unit 201 saves a setting result of the associating. Note that a configuration may be adopted in which a plurality of options are displayed at a time when a touch operation is performed in this manner, instead of associating one type of image processing with one touch operation, so as to allow the user to make a selection. For example, in the case where a press-hold operation is detected, the control unit 201 selectably displays a list of executable image processing in the selected area, and executes the processing selected by a user.

Figure 8E:
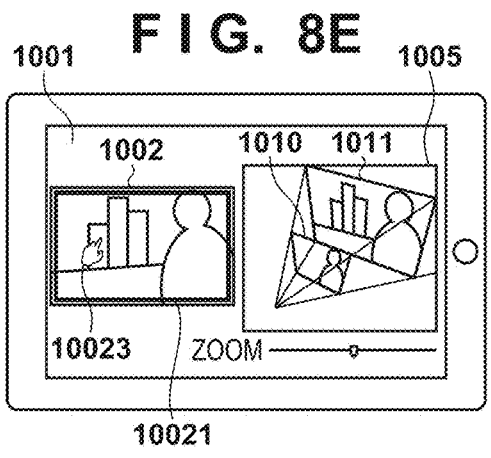
Figure 8F:
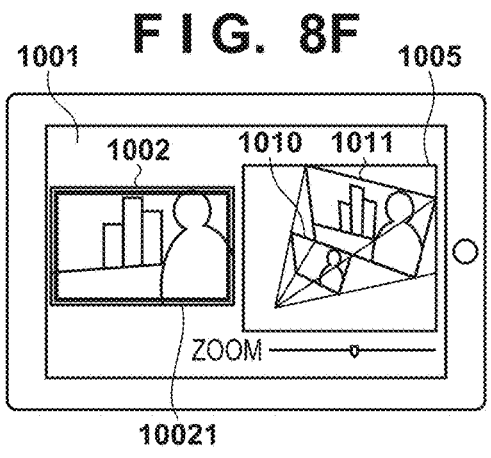
Figure 10D:
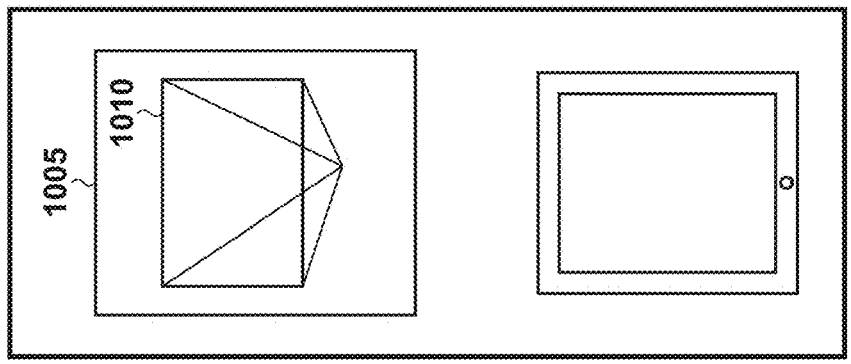
FIGS. 10A to 10D are diagrams schematically showing examples of display control of a depth-divided image in accordance with inclination of the image processing apparatus according to the embodiment.
Figure 10C:
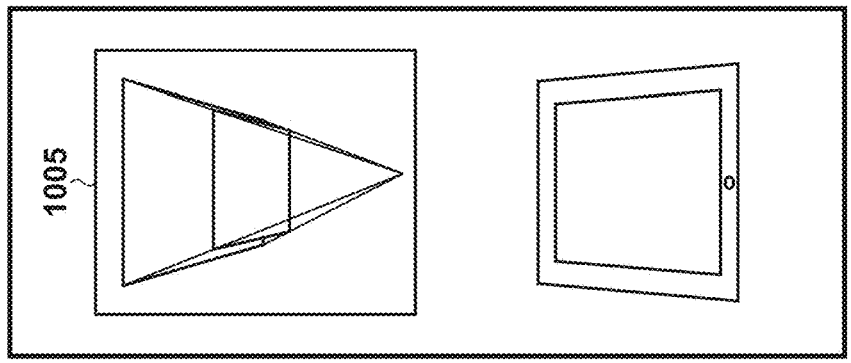
Figure 10B:
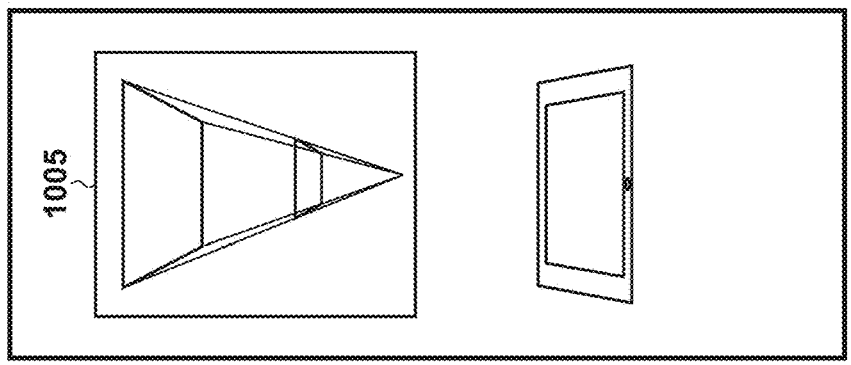
Figure 10A:
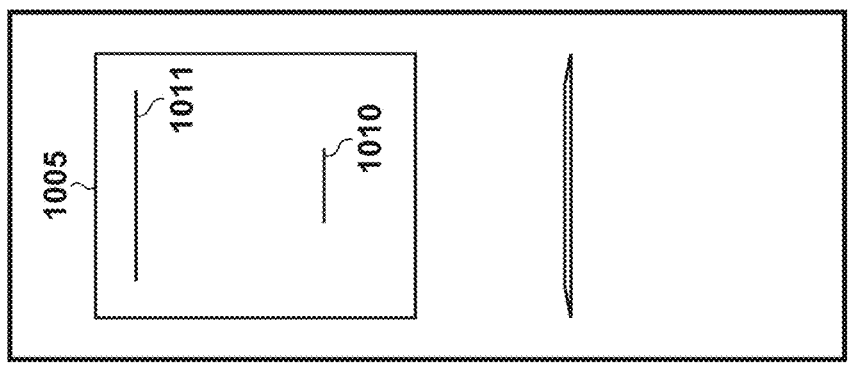

FIGS. 8E and 8F show examples of image processing for moving a subject by manipulating the captured image 1002. In FIG. 8E, a building at the back of the captured image 1002 is tapped by the finger 10023 of a user, and enters a selected state. Here, unlike a person, the area of the building has not been recognized, and therefore the indicator 10021 indicating that the entirety of the depth-divided image 1011 including the building is in a selected state is displayed.

When a drag operation is performed in a selected state, the control unit 201 recognizes it as an instruction to move the selected area in the drag direction. For example, as shown in FIG. 8F, in the case where a drag operation is performed in the right direction, the depth-divided image 1011 is moved in the right direction relatively with respect to the depth-divided image 1010, and this is reflected on display of the depth-divided images in the display area 1005 and display of the captured image 1002.

Note that an area in which a subject no longer exists due to the movement is interpolated using peripheral pixels, or a portion of a copied background. Alternatively, a captured image of a similar scene may be used for the interpolation. Note that a configuration may be adopted in which similar image processing is performed, also in the case where the operation described as an operation for a captured image is performed on a depth-divided image.

In the examples of FIGS. 7A, 7B and 8A to 8F, a viewpoint position and a viewing direction of a quadrangular pyramid used for the display format of depth-divided images are constant. However, in the case where the tablet computer 101 can detect inclination of the tablet computer, the viewpoint position and the viewing direction of the quadrangular pyramid may be changed in accordance with the inclination of the tablet computer to display depth-divided images.

FIGS. 10A to 10D schematically show corresponding examples between inclination of the tablet computer 101 and a viewpoint position and a viewing direction of a quadrangular pyramid that is used for a display format of depth-divided images. For example, in the case where the tablet computer 101 is horizontal (FIG. 10A), it is possible to intuitively understand distances between depth-divided images by displaying the quadrangular pyramid as viewed vertically from above. On the other hand, in the case where the tablet computer 101 is placed upright (FIG. 10D), the same display is obtained as the captured image 1002 because display is performed such that it appears like the depth-divided images are viewed from the front. Between the horizontal and the vertical (FIGS. 10B and 10C), display is performed with an angle that is in accordance with the angle of the tablet computer 101. Note that here, change in display in accordance with an angle around one axis was described for ease of understanding and explanation, but in actuality, display control in accordance with angles around two axes or three axes can be performed.

Note that in the above description, the distance image 42 has the same number of pixels as the captured image 41, and each of the pixel values (luminance values) indicates a subject distance of the corresponding pixel, but there are no particular limitations thereon. For example, a mode may be adopted in which the captured image is divided into a plurality of areas for each subject, and a subject distance is assigned to each of these areas of the subject. In addition, it is not necessary for image data to indicate a distance. For example, a sequence of numbers, table data or the like may be used as long as they give distance information to each of the pixels of the captured image 41.

As described above, according to the embodiment, a captured image is divided into a plurality of images in accordance with the distance range of a subject using distance information of the captured image, and the images are selectably presented to a user. Accordingly, there is an advantage in that it becomes easy to provide image processing that targets a subject existing at a specific distance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-016084, filed on Jan. 29, 2015, which is hereby incorporated by reference herein in its entirety.

What is claimed is:
1. An image processing apparatus comprising:
one or more programmable processors;
a memory storing a program that is executable by the one or more programmable processors and when executed, causes the one or more programmable processors to function as:
an obtaining unit configured to obtain a captured image and distance information of a subject in the captured image;
a generation unit configured to generate, from the captured image, a plurality of depth-divided images, each of the depth-divided images including only a subject of the captured image in a specific distance range that is different from the distance range of others in said plurality of depth-divided images, based on the distance information of the subject;
a display control unit configured to selectably display the plurality of depth-divided images; and
an image processing unit configured to apply image processing to an image selected from among the plurality of depth-divided images, and wherein the obtaining unit obtains the distance information of the subject in the captured image from a monochromatic distance image with a same number of pixels as the captured image, and wherein each pixel value indicates a subject distance of the corresponding pixel in the captured image to the image processing apparatus.

2. The image processing apparatus according to claim 1, wherein the generation unit generates the plurality of depth-divided images based on a distribution of subject distances indicated by the distance information.

3. The image processing apparatus according to claim 1, wherein the distance information is information that indicates a subject distance for each pixel in the captured image or each area of a subject in the captured image, and
wherein the generation unit:
divides the subject distances indicated by the distance information into a plurality of ranges, based on a distribution frequency of the subject distances, and
generates each of the plurality of depth-divided images from pixels included in the ranges of the divided subject distances.

4. The image processing apparatus according to claim 1, wherein the generation unit generates the plurality of depth-divided images based on a minimal value of a distribution of the subject distances.

5. The image processing apparatus according to claim 1, wherein the generation unit generates the plurality of depth-divided images by equally dividing a distribution of the subject distances.

6. The image processing apparatus according to claim 1, wherein the display control unit further displays a distribution of the subject distances, and
the generation unit generates the plurality of depth-divided images based on a position specified in the displayed distribution of the subject distances.

7. The image processing apparatus according to claim 1, wherein the display control unit further displays the captured image, and
the image processing unit applies the image processing to an image, out of the plurality of depth-divided images, corresponding to a subject at a position specified in the displayed captured image.

8. The image processing apparatus according to claim 1, wherein the program further causes the one or more programmable processors to function as:
a recognition unit configured to recognize a specific subject area in the captured image, and
wherein the image processing unit, in a case where the subject area recognized by the recognition unit is selected, applies the image processing to the selected subject area.

9. The image processing apparatus according to claim 1, wherein the display control unit displays the plurality of depth-divided images in ascending order of subject distance from an image corresponding to a range of short subject distances to an image corresponding to a range of long subject distances, such that the depth-divided images displayed in ascending order of subject distance increase in size.

10. The image processing apparatus according to claim 1, the program further causes the one or more programmable processors to function as:
a detection unit configured to detect inclination of the image processing apparatus, wherein the display control unit controls display of the plurality of depth-divided images in accordance with the inclination detected by the detection unit.

11. The image processing apparatus according to claim 1, wherein the apparatus is an image capture apparatus or an information processing apparatus.

12. An image processing method to be executed by an image processing apparatus, comprising:
   obtaining a captured image and distance information of a subject in the captured image;
   generating, from the captured image, a plurality of depth-divided images, each of the depth-divided images including only a subject of the captured image in a specific distance range that is different from the distance range of others in said plurality of depth-divided images, based on the distance information;
   selectably displaying the plurality of depth-divided images;
   selecting an image from among the plurality of depth-divided images; and
   applying image processing to the image selected from among the plurality of depth-divided images, and
   wherein the obtaining of the distance information of the subject in the captured image is done from a monochromatic distance image with a same number of pixels as the captured image, and wherein each pixel value indicates a subject distance of the corresponding pixel in the captured image to the image processing apparatus.

13. A non-transitory computer-readable recording medium that stores a computer-executable program, the program, when executed by the computer, causing the computer to function as an image processing apparatus comprising:
   an obtaining unit configured to obtain a captured image and distance information of a subject in the captured image;
   a generation unit configured to generate, from the captured image, a plurality of depth-divided images, each of the depth-divided images including only a subject of the captured image in a specific distance range that is different from the distance range of others in said plurality of depth-divided images, based on the distance information;
   a display control unit configured to selectably display the plurality of depth-divided images; and
   an image processing unit configured to apply image processing to an image selected from among the plurality of depth-divided images, and
   wherein the obtaining unit obtains the distance information of the subject in the captured image from a monochromatic distance image with a same number of pixels as the captured image, and wherein each pixel value indicates a subject distance of the corresponding pixel in the captured image to the image processing apparatus.

14. The image processing apparatus according to claim 1, wherein the image processing unit is configured to apply image processing to the image that is selected from among the plurality of depth-divided images by a user.

15. The method of claim 12, wherein the step of selecting an image from among the plurality of depth-divided images is done by a user.

* * * * *